United States Patent
Doi et al.

(10) Patent No.: US 7,319,683 B2
(45) Date of Patent: Jan. 15, 2008

(54) RADIO BASE STATION, CONTROL METHOD THEREFOR, AND PROGRAM RECORDING MEDIUM

(75) Inventors: Yoshiharu Doi, Gifu (JP); Takeo Miyata, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 1043 days.

(21) Appl. No.: 10/240,529

(22) PCT Filed: Mar. 23, 2001

(86) PCT No.: PCT/JP01/02359

§ 371 (c)(1),
(2), (4) Date: Sep. 30, 2002

(87) PCT Pub. No.: WO01/76099

PCT Pub. Date: Oct. 11, 2001

(65) Prior Publication Data

US 2003/0103477 A1    Jun. 5, 2003

(30) Foreign Application Priority Data

Apr. 3, 2000    (JP) .............................. 2000-101493

(51) Int. Cl.
*H04Q 7/00* (2006.01)

(52) U.S. Cl. ...................... 370/334; 370/314; 370/319; 370/322; 370/341; 370/348; 455/450; 455/451; 455/452.1

(58) Field of Classification Search ................ 370/314, 370/319, 322, 334, 341, 348; 455/450, 451, 455/452.1

See application file for complete search history.

(56) References Cited

U.S. PATENT DOCUMENTS

| 5,260,968 | A | * | 11/1993 | Gardner et al. | ............. 375/347 |
| 5,515,378 | A | * | 5/1996 | Roy et al. | .................... 370/334 |
| 5,732,075 | A | * | 3/1998 | Tangemann et al. | ........ 370/343 |
| 5,909,649 | A | * | 6/1999 | Saunders | ..................... 455/450 |
| 2004/0022205 | A1 | * | 2/2004 | Miyata et al. | .............. 370/319 |

FOREIGN PATENT DOCUMENTS

| JP | 11-127107 | 5/1999 |
| KR | 1999-003248 | 1/1999 |

OTHER PUBLICATIONS

Tanaka, Daisuke et al., Blocking Rate Performance of SDMA With a 3-Element Adaptive Array, Technical Report of IEICE, Sapporo, Japan, Feb. 1998, vol. 97, No. 549, pp. 95-100.

(Continued)

*Primary Examiner*—Steve M. D'Agosta

(57) ABSTRACT

In a radio base station (100) that communicates with a mobile station according to the PHS standards, a reception timing detection unit (55) measures the time when a UW signal of a signal separated by a signal regulating unit (51) for each mobile station is received with reference to the starting point of the time slot of a TDMA/TDD frame, as a reception timing signal. A control unit (80), when assigning a communication channel according to spatial multiplexing to a mobile station, allocates a communication channel in which a reception timing difference between the new mobile station and all mobile stations communicating is equal to or exceeds a threshold value.

6 Claims, 5 Drawing Sheets

QUALITY INDICATOR VALUE TABLE 300

| TIMESLOT NUMBER (301) | CHANNEL NUMBER (302) | CHANNEL NUMBER (303) | FIELD INTENSITY (304) | RECEPTION TIMING (305) |
|---|---|---|---|---|
| 1 | 1 | R1 | I1 | P1 |
| | 2 | R2 | I2 | P2 |
| | 3 | (BLANK) | (BLANK) | (BLANK) |
| | 4 | (BLANK) | (BLANK) | (BLANK) |
| 2 | 1 | Rx | Ix | Px |
| | 2 | (BLANK) | (BLANK) | (BLANK) |
| | 3 | (BLANK) | (BLANK) | (BLANK) |
| | 4 | (BLANK) | (BLANK) | (BLANK) |
| . | . | . | . | . |
| . | . | . | . | . |
| . | . | . | . | . |
| n | 1 | R91 | I91 | P91 |
| | 2 | R92 | I92 | P92 |
| | 3 | R93 | I93 | P93 |
| | 4 | R94 | I94 | P94 |

OTHER PUBLICATIONS

Farsakh, C. et al. "A Real Time Downlink Channel Allocation Scheme for an SDMA Mobile Radio System", Seventh IEEE International Symposium on Peronsal Indoor and Mobil, Radio Communications, vol. 3, Oct. 15-18, 1996, pp. 1216-1220.

"A Study on reference signal synchronization for PHS/SDMA system," Technical Report Of IEICE (Jun. 1999).

"A Criterion of Channel Assignment for SDMA with an Adaptive Array," Journal of the Institute Of Electronics, Information, and Communication Engineers, No. 11, Nov. 1999.

* cited by examiner

Fig. 2

THRESHOLD VALUE TABLE 200

| CORRELATION VALUE THRESHOLD VALUE Jt | FIELD INTENSITY RATIO THRESHOLD VALUE Kt | RECEPTION TIMING DIFFERENCE THRESHOLD VALUE Lt |
|---|---|---|
| 0.1 | 0.9 | 1.0 |

Fig. 3

QUALITY INDICATOR VALUE TABLE 300

| TIMESLOT NUMBER | CHANNEL NUMBER | CHANNEL NUMBER | FIELD INTENSITY | RECEPTION TIMING |
|---|---|---|---|---|
| 1 | 1 | R1 | I1 | P1 |
| 1 | 2 | R2 | I2 | P2 |
| 1 | 3 | (BLANK) | (BLANK) | (BLANK) |
| 1 | 4 | (BLANK) | (BLANK) | (BLANK) |
| 2 | 1 | Rx | Ix | Px |
| 2 | 2 | (BLANK) | (BLANK) | (BLANK) |
| 2 | 3 | (BLANK) | (BLANK) | (BLANK) |
| 2 | 4 | (BLANK) | (BLANK) | (BLANK) |
| ⋮ | ⋮ | ⋮ | ⋮ | ⋮ |
| n | 1 | R91 | I91 | P91 |
| n | 2 | R92 | I92 | P92 |
| n | 3 | R93 | I93 | P93 |
| n | 4 | R94 | I94 | P94 |

RADIO BASE STATION, CONTROL METHOD THEREFOR, AND PROGRAM RECORDING MEDIUM

TECHNICAL FIELD

The present invention relates to a radio base station that performs radio communication with a plurality of mobile stations according to spatial multiplexing.

BACKGROUND ART

Accompanying increases in mobile stations such as PHS and portable telephones in recent years, there is a heightened social demand for effective use of frequency resources. One method that responds to this demand is communication according to the spatial multiplexing method.

The spatial multiplexing method is a method in which communication is performed by multiplexing using a carrier wave of one frequency at one time, with use of an adaptive array device that is directional in both transmission and reception to form a directional pattern towards each of a plurality of mobile stations that are in different directions.

The adaptive array device is composed of a plurality of fixed antennas, and is characterized in that it adjusts the amplitude and phase of transmission and reception waves of each individual antenna to form directivity for the plurality of antennas overall.

A radio base station that connects with a plurality of mobile stations through spatial multiplexing uses an adaptive array device. In order to separate the signal of each individual mobile station from a received signal in which the signals of the plurality of mobile stations are multiplexed, the radio base station calculates a weight factor. The weight factor is the amount that the amplitude and phase of the signal received by each antenna for each mobile station are adjusted.

The radio base station compares a signal that is obtained by multiplying the signal received by each antenna by the weight factor for the particular antenna and adding the result of each multiplication together, with a reference signal, and adjusts the weight factor so that the difference between the two signals is a minimum. Signal wave pattern data corresponding to a known set bit pattern that is a part of a control channel signal or communication channel signal is used as the reference signal.

The radio base station performs this adjustment repeatedly, and by calculating the weight factor for each antenna in regard to each mobile station that is being spatially multiplexed, and multiplying each signal received by each antenna with the weight factor for the particular antenna and adding the results together, separates the signal of each of the plurality of mobile stations. In transmission, the radio base station forms a directivity pattern towards each mobile station by transmitting a signal from each antenna that is a signal multiplied with the weight factor that was calculated at reception.

Note that spatial multiplexing techniques are described in "Path Division Multiple Access (PDMA) Mobile Communication System", The Technical Report of the Proceeding of the Institute of Electronics, Information, and Communication Engineers RCS93-84(1994-01), pp. 37-44.

The radio base station judges whether a mobile station with which it is already communicating and another mobile station from which the radio base station has newly received a request for allocation of a communication channel are a suitable combination for communication according to spatial multiplexing, in the following way.

The radio base station calculates a response vector of both the mobile stations, and calculates a correlation value between the two calculated response vectors. Here, the response vector is information about the direction of the mobile station. The response vector correspondence value is an indicator showing how close the directions of the two mobile stations are.

When the calculated correspondence value is higher than a threshold value, it is considered that it is impossible to separate the signals of both of the mobile stations by a difference in directivity patterns because the two mobile stations are in substantially the same direction. In this case, the radio base station judges the mobile stations to be an unsuitable combination for spatial multiplexing.

Furthermore, the radio base station measures the field intensity of the signal from each of the mobile stations, and calculates a ratio of the two measured field intensities.

If the calculated field intensity ratio is higher than a threshold value, it is thought that the two signals cannot be suitably separated even if an optimal directivity pattern is formed because the intensity ratio of the two signals is higher than the gain ratio of the adaptive array device. In this case, the radio base station judges the mobile stations to be an unsuitable combination for spatial multiplexing.

The radio base station, which also uses a time division multiplex system to connect with the plurality of mobile stations, judges whether spatial multiplexing is suitable in each time slot in regard to the time division multiplex when allocating a communication channel to a new mobile station and there is no space in a timeslot in time division multiplex communication. The radio base station allocates the communication channel according to spatial multiplexing in a timeslot that is not being used by the mobile station that was judged to be unsuitable for spatial multiplexing with the new mobile station.

In this way, the radio base station performs spatial multiplexing only through combinations of mobile stations that are suitable for spatial multiplexing communication. In addition, during spatial multiplexing the radio base station follows the direction of each mobile station with the directivity pattern of the adaptive array device. Accordingly, communication is performed preventing mixing of voices and maintaining suitable communication quality.

In the above-described conventional technique, in allocating a communication channel to a new mobile station through spatial multiplexing, the radio base station judges whether spatial multiplexing between a new mobile station and a mobile station that is already communicating is suitable by comparing the correlation value of the response vectors of the two mobile stations and the ratio of the field intensity of the signal received from the two mobile stations with respective threshold values, to judge whether the two mobile stations are a suitable combination for spatial multiplexing. However, in this method there are cases in which, even when the two mobile stations are judged to be a suitable combination for spatial multiplexing, calculation of the weight factor fails and a correct directivity pattern cannot be formed.

This failure occurs in the following way.

It is desirable for the reference signal to be different for each mobile station in order for the weight factor to be calculated correctly. This is because if the waveform of the reference signal is completely the same for a plurality of mobile stations and the compared timing matches completely, the reference signals will no longer be a basis on which to differentiate the mobile stations.

In reality, since each mobile station generates its own operation clock, the timing of the signal received from each mobile station is different, so it is rare the timing completely matches. The radio base station utilizes this to detect the timing of the signal received from each mobile station, and calculate the weight factor by following the detected timing and staggering the comparative timing of each mobile station relative to the reference signal.

However, since occasionally timing of reception of signals from two mobile stations is substantially the same, cases occur in which the weight factor of the mobile stations cannot be calculated correctly. With recent improvements in the accuracy of circuit elements that compose mobile stations, employment of techniques for frame synchronization between a plurality of base stations, developments in circuit technology, and so on, such cases are occurring much more frequently.

If the radio base station cannot calculate a weight factor correctly, an appropriate directivity pattern cannot be formed towards each mobile station. Consequently, a problem arises that not only can a new mobile station not begin communication, but mobile stations already communicating may experience interruptions, and users cannot be assured appropriate communication quality.

DISCLOSURE OF THE INVENTION

In order to solve the above-described problems, the object of the present invention is to provide a radio base station that improves the accuracy of judgements about the suitability of spatial multiplexing, and that assures constant communication quality between the radio base station and mobile stations.

The radio base station of the present invention is a radio base station that performs radio communication with a plurality of mobile stations according to spatial multiplexing, characterized by: judging communication quality of the spatial multiplexing, based on a reception timing difference between a signal received from a first mobile station and a signal received from a second mobile station.

According to this structure, communication quality when two mobile stations are spatially multiplexed can be predicted based on a difference in timing of signals received from the mobile stations. Therefore, if the radio base station, when it receives a communication channel allocation request from a new mobile station, takes into consideration the reception timing difference between a signal received from the new mobile station and a signal received from the mobile station already communicating with the radio base station to judge whether spatial multiplexing is applicable, accuracy in the judgement is improved compared to the conventional technique of judging based only on the response vector correlation value and the field intensity ratio. Furthermore, more favorable communication quality can be ensured in spatial multiplexing communication.

The radio base station of the present invention is a radio base station that performs radio communication with a plurality of mobile stations according to spatial multiplexing, characterized by: judging whether the spatial multiplexing is applicable, based on a reception timing difference between a signal received from a mobile station already communicating with the radio base station and a signal received from a mobile station that is newly initiating communication with the radio base station.

Furthermore, the radio base station may include a detection unit for detecting the reception timing difference between the signal received from the mobile station already communicating with the radio base station and the signal received from the mobile station that is newly initiating communication with the radio base station; and a multiplex judgement unit for judging, by comparing the detected reception timing difference with a threshold value, whether the mobile station that is newly initiating communication with the radio base station can be included as a member for the spatial multiplexing.

According to these structures, the radio base station can judge whether communication according to spatial multiplexing is applicable, based on the reception timing difference between the signals received from the two signals. Therefore, when the reception timing difference is small and it is possible that suitable directivity cannot be formed in regard to the mobile stations, by refusing communication channel allocation according to spatially multiplexing, mixed voices and the like are avoided, and favorable communication quality is ensured.

Furthermore, the radio base station may further include a calculation unit for calculating (a) a correlation value between a response vector of the mobile station already communicating with the radio base station and a response vector of the mobile station that is newly initiating communication with the radio base station, and (b) a ratio of a field intensity of the signal received from the mobile station already communicating with the radio base station to a field intensity of the signal received from the mobile station that is newly initiating communication with the radio base station, wherein the multiplex judgement unit judges whether the mobile station that is newly initiating communication with the radio base station can be included as a member for spatial multiplexing, by comparing the calculated correlation value between the response vectors, the calculated ratio of the field intensity, and the detected reception timing difference, with respective threshold values.

Furthermore, the radio base station may instruct an identical time frame as a period for signal transmission, to the mobile station already communicating with the radio base station and the mobile station that is newly initiating communication with the radio base station, and receiving the signal from both the mobile stations in the identical time frame, wherein the detection unit measures a time at which a signal is received from each of the mobile stations, using a starting point of the time frame as a basis, and detects a difference between the time at which each signal is received as the reception timing difference.

According to these structures, communication quality when two mobile stations are spatially multiplexed can be predicted using a difference in timing of signals received from the mobile stations, a correlation value of the response vector, and a ratio of the field intensity. Therefore, accuracy in judging whether spatial multiplexing is applicable can be improved, and communication according to spatial multiplexing permitted only for suitable combinations of mobile stations.

A control method of the present invention is a control method for a radio base station that performs radio communication with a plurality of mobile stations according to spatial multiplexing, including: a detection step of detecting the reception timing difference between the signal received from the mobile station already communicating with the radio base station and the signal received from the mobile station that is newly initiating communication with the radio base station; and a multiplex judgement step of judging, by comparing the detected reception timing difference with a threshold value, whether the mobile station that is newly initiating communication with the radio base station can be included as a member for the spatial multiplexing.

According to this structure, the radio base station can judge whether communication according to spatial multiplexing is applicable, based on the reception timing difference between the signals received from the two signals. Therefore, when the reception timing difference is small and it is possible that suitable directivity cannot be formed in regard to the mobile stations, by refusing communication channel allocation according to spatially multiplexing, mixed voices and the like are avoided, and favorable communication quality is ensured.

Furthermore, the control method may further include a calculation step of calculating (a) a correlation value between a response vector of the mobile station already communicating with the radio base station and a response vector of the mobile station that is newly initiating communication with the radio base station, and (b) a ratio of a field intensity of the signal received from the mobile station already communicating with the radio base station to a field intensity of the signal received from the mobile station that is newly initiating communication with the radio base station, wherein, in the multiplex judgement step, the judgement is about whether the mobile station that is newly initiating communication with the radio base station can be included as a member for spatial multiplexing, by comparing the calculated correlation value between the response vectors, the calculated ratio of the field intensity, and the detected reception timing difference, with respective threshold values.

According to this structure, communication quality when two mobile stations are spatially multiplexed can be predicted using a difference in timing of signals received from the mobile stations, a correlation value of the response vector, and a ratio of the field intensity. Therefore, accuracy in judging whether spatial multiplexing is applicable can be improved, and communication according to spatial multiplexing permitted only for suitable combinations of mobile stations.

A program recording medium of the present invention is a program recording medium having recorded thereon a program for controlling a radio base station that performs radio communication with a plurality of mobile stations according to spatial multiplexing, the program comprising: a detection step of detecting the reception timing difference between the signal received from the mobile station already communicating with the radio base station and the signal received from the mobile station that is newly initiating communication with the radio base station; and a multiplex judgement step of judging, by comparing the detected reception timing difference with a threshold value, whether the mobile station that is newly initiating communication with the radio base station can be included as a member for the spatial multiplexing.

According to this structure, the radio base station can judge whether communication according to spatial multiplexing is applicable, based on the reception timing difference between the signals received from the two signals. Therefore, when the reception timing difference is small and it is possible that suitable directivity cannot be formed in regard to the mobile stations, by refusing communication channel allocation according to spatially multiplexing, mixed voices and the like are avoided, and favorable communication quality is ensured.

Note that the program may further include a calculation step of calculating (a) a correlation value between a response vector of the mobile station already communicating with the radio base station and a response vector of the mobile station that is newly initiating communication with the radio base station, and (b) a ratio of a field intensity of the signal received from the mobile station already communicating with the radio base station to a field intensity of the signal received from the mobile station that is newly initiating communication with the radio base station, wherein, in the multiplex judgement step, the judgement is about whether the mobile station that is newly initiating communication with the radio base station can be included as a member for spatial multiplexing, by comparing the calculated correlation value between the response vectors, the calculated ratio of the field intensity, and the detected reception timing difference, with respective threshold values.

According to this structure, communication quality when two mobile stations are spatially multiplexed can be predicted using a difference in timing of signals received from the mobile stations, a correlation value of the response vector, and a ratio of the field intensity. Therefore, accuracy in judging whether spatial multiplexing is applicable can be improved, and communication according to spatial multiplexing permitted only for suitable combinations of mobile stations.

BRIEF DESCRIPTION OF THE DRAWINGS

FIG. 2 is one example showing a threshold value table 200;

FIG. 3 is one example showing a quality indicator value table 300;

BEST MODE FOR CARRYING OUT THE INVENTION

The following describes a radio base station 100 in one embodiment.

The radio base station 100 connects wirelessly with one or more PHS mobile stations (hereinafter "mobile station(s)") according to a TDMA/TTD (Time Division Multiple Access/Time Division Duplex) method prescribed by the PHS standard. In addition to TDMA/TDD, the radio base station 100 communicates with the mobile station by further performing spatial multiplexing.

1 Structure of the Radio Base Station 100

Figure 1:
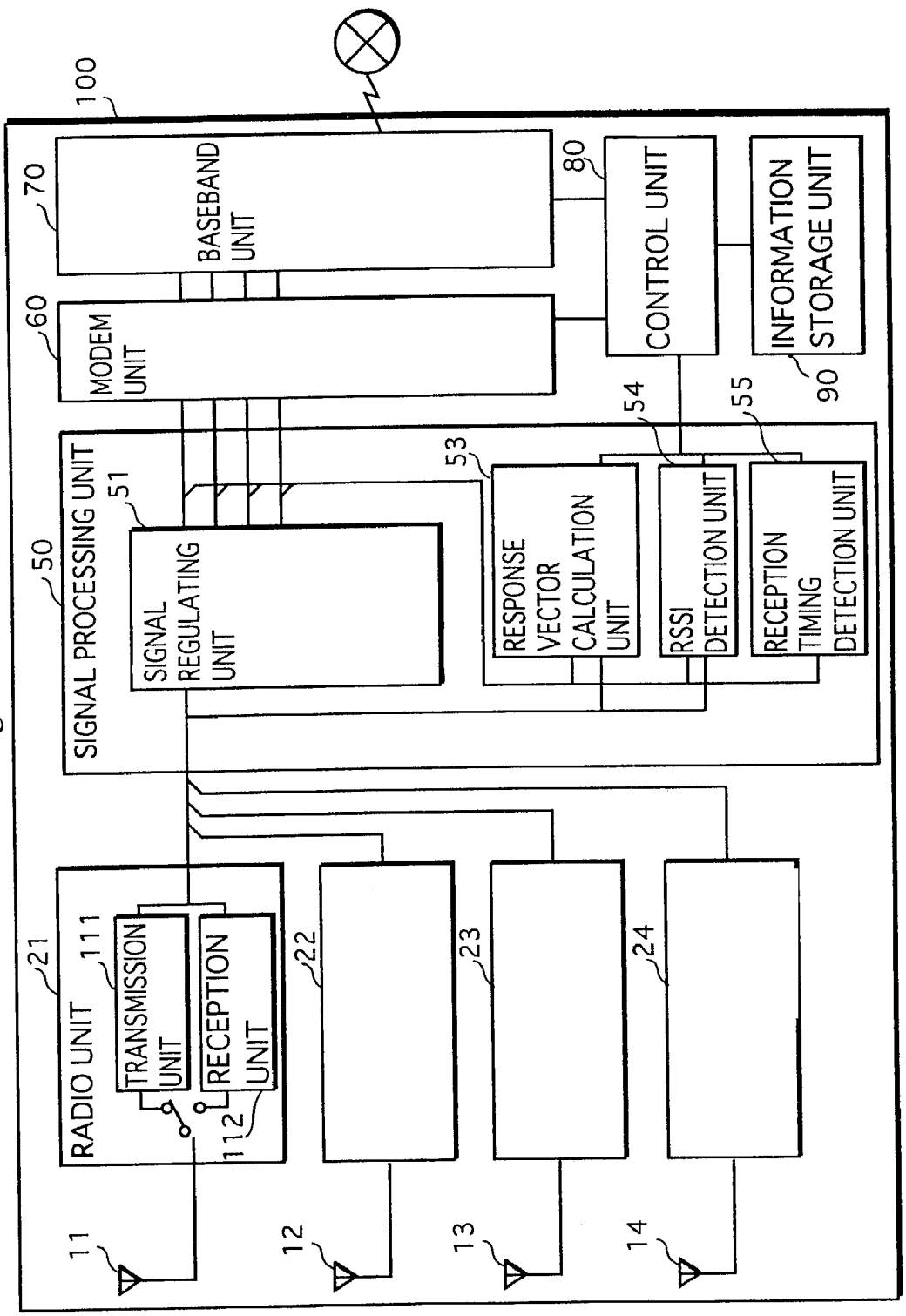
FIG. 1 is a function block diagram of a radio base station 100.

The radio base station 100, as FIG. 1 shows, is composed of antenna units 11 to 14, radio units 21 to 24, a signal processing unit 50, a modem unit 60, a baseband unit 70, a control unit 80, and an information storage unit 90.

(1) Baseband Unit 70

The baseband unit 70 is connected via an ISDN line to an exchange.

The baseband unit 70 receives packet data via the ISDN line, extracts traffic information from the received packet data, and performs TDMA modulation processing and spatial multiplex processing to break down the extracted traffic information via a plurality of channels into a plurality of baseband signals that it outputs to the modem unit 60.

Here, the TDMA modulation processing is time division multiplexing of four channels of one TDMA/TDD frame, according to the PHS standard. One TDMA/TDD frame is composed of four transmission timeslots and four reception timeslots. A set of one transmission timeslot and one reception timeslot composes one channel in time division multiplexing. In addition, the spatial multiplexing processing spatially multiplexes a maximum of four channels in each timeslot set. Accordingly, a maximum of 16 channels are multiplexed in one TDMA/TDD frame according to TDMA modulation processing and spatial multiplexing processing.

Furthermore, the baseband unit 70 receives a plurality of baseband signals from the modem 60 via the maximum of 16 channels in one TDMA/TDD frame. The baseband unit 70 generates packet data from the received plurality of baseband signals, and outputs the generated packet data via the ISDN line.

(2) Modem Unit 60

The modem unit 60 receives baseband signals from the signal processing unit 50 that have been modulated according to Π/4 shift QPSK (Quadrature Phase Shift Keying), demodulates the modulated baseband signals to generate baseband signals, and outputs the generated baseband signals to the baseband unit 70.

Furthermore, the modem unit 60 receives baseband signals from the baseband unit 70, modulates the received baseband signals according to Π/4 shift QPSK, and outputs the modulated baseband signals to the signal processing unit 50.

Note that the modem unit 60 modulates (or demodulates) in parallel a maximum of four TDMA/TDD frames spatially multiplexed in one time division channel.

(3) Information Storage Unit 90

The information storage unit 90 has a threshold value table 200 and a quality indicator value table 300.

<Threshold Value Table 200>

The threshold value table 200, as shown in FIG. 2 as one example, pre-stores a correlation value threshold value 211, a field intensity ratio threshold value 212, and a reception timing difference threshold value 213.

Here, the correlation value threshold value 211 is a threshold value regarding a correlation value between a response vector of a mobile station that is already allocated a communication channel and that is communicating with the radio base station 100 and a mobile station that has newly requested to be allocated a communication channel.

The field intensity ratio threshold value 212 is a threshold value regarding the ratio of the field intensity of a signal received from a mobile station that has already been allocated a communication channel and that is communicating with the radio base station 100, and the field intensity of a mobile station that has newly requested to be allocated a communication channel.

The reception timing difference threshold value 213 is a threshold value regarding the difference in timing between reception from the mobile station that has already been allocated a communication channel and that is communicating with the radio base station 100 and reception from the mobile station that has newly requested to be allocated a communication channel.

<Quality Indicator Value Table 300>

The quality indicator value table 300, as shown in FIG. 3 as one example, has n areas, each of which stores a response vector 303, a field intensity 304, and a reception timing 305 of each of the four channels being spatially multiplexed in each time slot in a TDMA/TDD frame.

Here, n=(number of types of carrier wave frequency)* 4(number of timeslots in frame).

As shown in FIG. 3 as one example, in the timeslot whose timeslot number is "1", the mobile station using the communication channel whose channel number is "1" has a response vector "R1", a field intensity "I1", and a reception timing "P1". In the same timeslot, the mobile station using the communication channel whose channel number is "2" has a response vector "R2", a field intensity "I2", and a reception timing "P2". Communication channels 3 and 4 are not yet being used and therefore their respective response vectors, field intensities, and reception timings are "blank".

(4) Signal Processing Unit 50

The signal processing unit 50 is composed of a signal regulating unit 51, a response vector calculation unit 53, an RSSI detection unit 54, and a reception timing detection unit 55. Specifically, the signal processing unit 50 is implemented by a programmable DSP (Digital Signal Processor).

<Signal Regulating Unit 51>

The signal regulating unit 51 receives signals from the radio units 21 to 24, and, in each of the four reception timeslots in each TDMA/TDD frame, calculates the weight factor for each mobile station so that the difference between the part of the content of the received signal that is known in advance and the reference signal is a minimum. Then, the signal regulating unit 51 adjusts the amplitude and phase of the signals received from the radio units 21 to 24 for each mobile station, according to the calculated weight factor, and adds the adjusted signals. Accordingly, the signal for each mobile station is separated from the spatial multiplexed signals received from the radio units 21 to 24, and the separated signals output to the modem unit 60. Furthermore, the signal regulating unit 51 multiplies each of the signals received from the modem unit 60 by the weight factor for each antenna, and outputs the results to the radio units 21 to 24. Accordingly, a directivity pattern is formed so that the signal is transmitted only to the desired mobile station.

<RSSI Detection Unit 54>

Each timeslot in each TDMA/TDD frame, the RSSI detection unit 54 detects the field intensity of the mobile station from which the radio units 21 to 24 received the signal in the particular timeslot. For a mobile station that has already been allocated a communication channel and is communicating, the RSSI detection unit 54 writes the detected field intensity in the area that is specified by the particular timeslot and channel number in the quality indicator value table 300. For a mobile station that has newly requested to be allocated a communication channel, the RSSI detection unit 54 outputs the detected field intensity to the control unit 80.

Note that the RSSI detection unit 54 performs the aforementioned detection when there has been a communication channel allocation request from a mobile station.

<Response Vector Calculation Unit 53>

Each timeslot in each TDMA/TDD frame, the response vector calculation unit 53 calculates the response vectors that include direction information about the mobile stations that are communicating with the radio base station 100, based on the signals received from the radio units 21 to 24 and the signals adjusted by the signal regulating unit 51. The calculation is performed in the following way.

Signals Aa(t), Ab(t), Ac(t), and Ad(d) transmitted respectively from mobile stations a, b, c, and d reach the base station. Here, representing the signals received by the radio units 21 to 24 by X1(t), X2(t), X3(t), and X4(t) respectively, and expressed as $$X1(t)=h1aAa(t)+h1bAb(t)+h1cAc(t)+h1dAd(t)$$

$$X2(t)=h2aAa(t)+h2bAb(t)+h2cAc(t)+h2dAd(t)$$

$$X3(t)=h3aAa(t)+h3bAb(t)+h3cAc(t)+h3dAd(t)$$

$$X4(t)=h4aAa(t)+h4bAb(t)+h4cAc(t)+h4dAd(t),$$

the response vector calculation unit 53 calculates Ra=(h1a, h2a, h3a, h4a). Here, Ra is the response vector of mobile station a.

Theoretically, by taking the correlation between the signal Xl(t) received by the radio unit 21 and the signal Aa(t) transmitted from the mobile station a, the terms of signals from other stations disappear and h1a found. However, since it is impossible to know Aa(t) over the whole of the signal from the mobile station, a signal Ua of the mobile station a separated by the signal regulating unit 51 is used as a substitute to find h1a asymptotically. The correlation with each of the signals received by the radio units and the separated signal Ua of the mobile station a is also found for h2a, h3a, and h4a.

The response vectors Rb, Rc, and Rd for the mobile stations b, c, and d are calculated in the same way.

For a mobile station that is has already been allocated a communication channel and is communicating with the radio base station 100, the response vector calculation unit 53 writes the calculated response vector in the area that is specified by the particular timeslot and channel number in the quality indicator value table 300. For a mobile station that has newly requested to be allocated a communication channel, the response vector calculation unit 53 outputs the calculated response vector to the control unit 80.

Note that the response vector calculation unit 53 performs the aforementioned calculation when there has been a communication channel allocation request from a mobile station.

<Reception Timing Detection Unit 55>

Each timeslot in each TDMA/TDD frame, the reception timing detection unit 55 obtains a signal separated for each mobile station from the signal regulating unit 51, and measures the time at which a UW signal is received with reference to the starting point of the particular timeslot, for each mobile station that is communicating in the timeslot, in the following way.

Amongst the series of signals that are transmitted in a timeslot, the part in which the UW signal is included is specified in the PHS standard. The reception timing detection unit 55 stores the reception signal waveform of the UW signal in advance. The reception timing detection unit 55 calculates the correlation value between the signal waveform of the part in the reception signal separated for each mobile station by the signal regulating unit 51 that corresponds to the UW signal and the signal waveform stored in advance. Here, the calculated correlation value is an indicator expressing the degree to which the two waveforms match.

In addition to the calculated correlation value, the reception timing detection unit 55 also calculates several correlation values in the following way. The reception timing detection unit 55 determines target periods that deviate backward or forward from the part that corresponds to the UW signal by a communication time of one to several symbols, and for each target period the reception timing detection unit 55 calculates a correlation value between the signal waveform of the target period in the reception signal separated for each mobile station by the signal regulating unit 51 and the signal waveform stored in advance. The period in which the highest correlation value is obtained is judged to be the real period (timing) at which the UW signal was received.

The reception timing detection unit 55 treats the starting point of the period that was judged to be when the UW signal was received based on the start point of the timeslot as the reception timing for each mobile station. Note that the resolution is determined by the number of oversamples for one waveform cycle.

For a mobile station that has already been allocated a communication channel and is communicating with the radio base station 100, the reception timing detection unit 55 writes the measured reception timing in the area that is specified by the particular timeslot and channel number in the quality indicator value table 300. For a mobile station that has newly requested to be allocated a communication channel, the reception timing detection unit 55 outputs the measured reception timing to the control unit 80.

Note that the reception timing detection unit 55 performs the aforementioned measuring when there has been a communication channel allocation request from a mobile station.

(6) Control Unit 80

Specifically, the control unit 80 is composed of a microprocessor, a ROM (Read Only Memory) in which a computer program is recorded (hereinafter "program"), a RAM (Random Access Memory) that is used for operations, and so on. The control unit 80 achieves its functions by the microprocessor executing the program recorded in the ROM.

The control unit 80 controls the operations of the radio base station 100 overall.

<Link Channel Establishment Processing>

The control unit 80 performs the following link channel establishment processing when a link channel establishment request or a link channel re-establishment request (a signal requesting communication channel allocation or re-allocation) is received from a mobile station.

The control unit 80 checks the timeslots in the TDMA/TDD frame successively, and if there is no other mobile station communicating in the particular timeslot, allocates a communication channel in that timeslot. If another mobile station is communicating, the control unit 80 performs a multiplex judgement process shown below, and if it is judged according to the process that multiplexing is applicable, allocates a communication channel in the particular timeslot according to spatial multiplexing. When it is judged that multiplexing is not applicable, the control unit 80 repeats the judgement in other timeslots, and if it is judged in all timeslots that multiplexing is not applicable, refuses communication channel allocation.

<Multiplex Judgement Process>

According to the multiplex judgement process, the control unit 80 judges in the following way whether spatial multiplexing of a mobile station that has newly requested to be allocated a communication channel and a mobile station that has already been allocated a communication channel and is communicating is possible or not.

The control unit 80 receives, from the response vector calculation unit 53, the response vector Ra of the mobile station a that has newly requested to be allocated a communication channel, reads the response vector Rx of the mobile station X that is already assigned a communication channel and is communicating with the radio base station 100 from the area in the quality indicator value table 300 identified by the particular timeslot number and channel number, and calculates the correlation value Ja between the response vector Ra and the response vector Rx.

Next, the control unit 80 receives from the RSSI detection unit 54 the field intensity Ia of the mobile station a that has newly requested to be allocated a communication channel, reads the field intensity Ix of the mobile station X that is already assigned a communication channel and is communicating with the radio base station 100 from the area in the quality indicator value table 300 identified by the particular timeslot number and channel number, and calculates a field intensity ratio Ka according to $$Ka=|20\text{Log}10\ (Ia/Ix)|.$$

Next, the control unit 80 receives the reception timing Pa of the mobile station a that has newly requested to be allocated a communication channel from the reception timing detection unit 55, reads the reception timing Pl. On the mobile station X that is already assigned a communication channel and is communicating with the radio base station 100 from the area in the quality indicator value table 300 identified by the particular timeslot number and channel number, and calculates the reception timing difference La according to $$La=|Pa-Px|.$$

Next, the control unit 80 compares the calculated correlation value Ja and the correlation value threshold value Jt that is stored in the threshold value table 200. Furthermore, the control unit 80 compares the calculated field intensity ratio Ka and the field intensity ratio threshold value Kt that is stored in the threshold value table 200. Furthermore, the control unit 80 compares the calculated reception timing difference La and the reception timing difference threshold value that is stored in the threshold value table 200.

When $Ja \leq Jt$ and $Ka \leq Kt$ and $La \geq Lt$, the control unit 80 judges that it is possible to spatially multiplex the mobile station that has newly requested to be allocated a communication channel and the mobile station that has already been allocated a communication channel and is communicating with the radio base station 100 in the same timeslot. In any other case, the control unit 80 judges multiplexing to not be possible.

Note that when a plurality of mobile stations (two to three mobile stations) are already communicating in a timeslot according to spatial multiplexing, the control unit 80 performs the judgement processing for each mobile station, and when it is judged that spatial multiplexing between all the mobile stations that are communicating and the new mobile station is possible, the control unit 80 judges that spatial multiplexing is possible in that timeslot.

2 Operations of the Radio Base Station 100

The following describes the operations of the radio base station 100.

Figure 4:
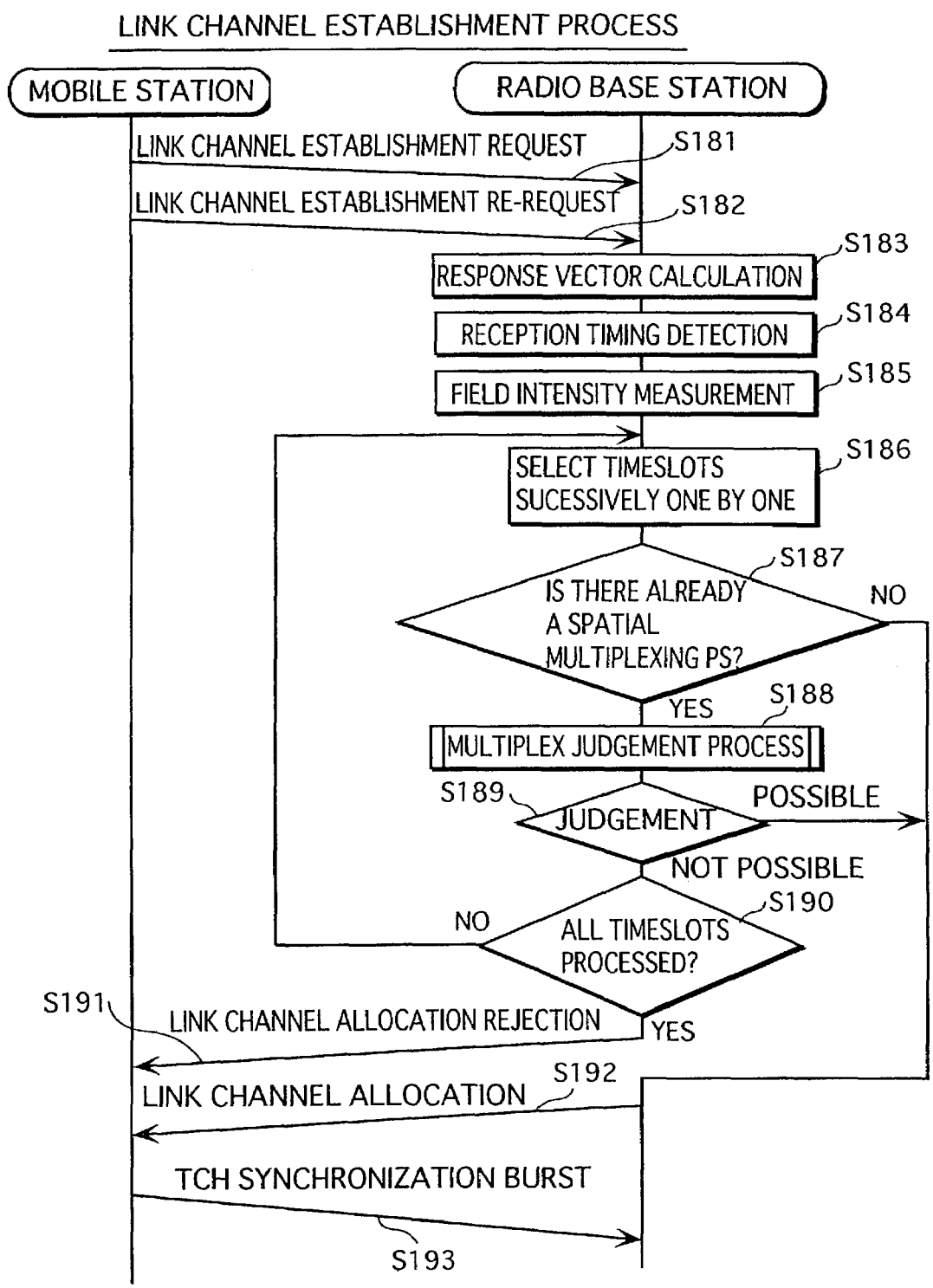
FIG. 4 is a flowchart showing a link channel establishment procedure.

Operations during link channel establishment are described with use of the flowchart shown in FIG. 4.

The radio base station 100 receives a link channel establishment request from a mobile station (step S181), or the radio base station 100 receives a link channel re-establishment request from a mobile station (step S182). Then the response vector calculation unit 53 calculates the response vector (step S183), the reception timing detection unit 55 calculates the reception timing (step S184), and the RSSI detection unit 54 measures the field intensity (step S185).

The control unit 80 selects one time slot at a time in a TDMA/TDD frame (step S186), and judges whether there is already a mobile station communicating in the particular timeslot (step S187). If there is no mobile station already communicating in that timeslot, the control unit 80 allocates a communication channel to the mobile station that requested a communication channel (step S192). If there is already a mobile station communicating, the control unit 80 performs the multiplex judgement process (step S188), and if multiplexing is judged to be possible (step S189), allocates a communication channel according to spatial multiplexing to the mobile station that requested a communication channel (step S192). If multiplexing is judged not to be possible, the process is repeated for another timeslot (step S190), and if multiplexing is judged not to be possible in any timeslot, the control unit 80 refuses communication channel allocation (step S191).

Figure 5:
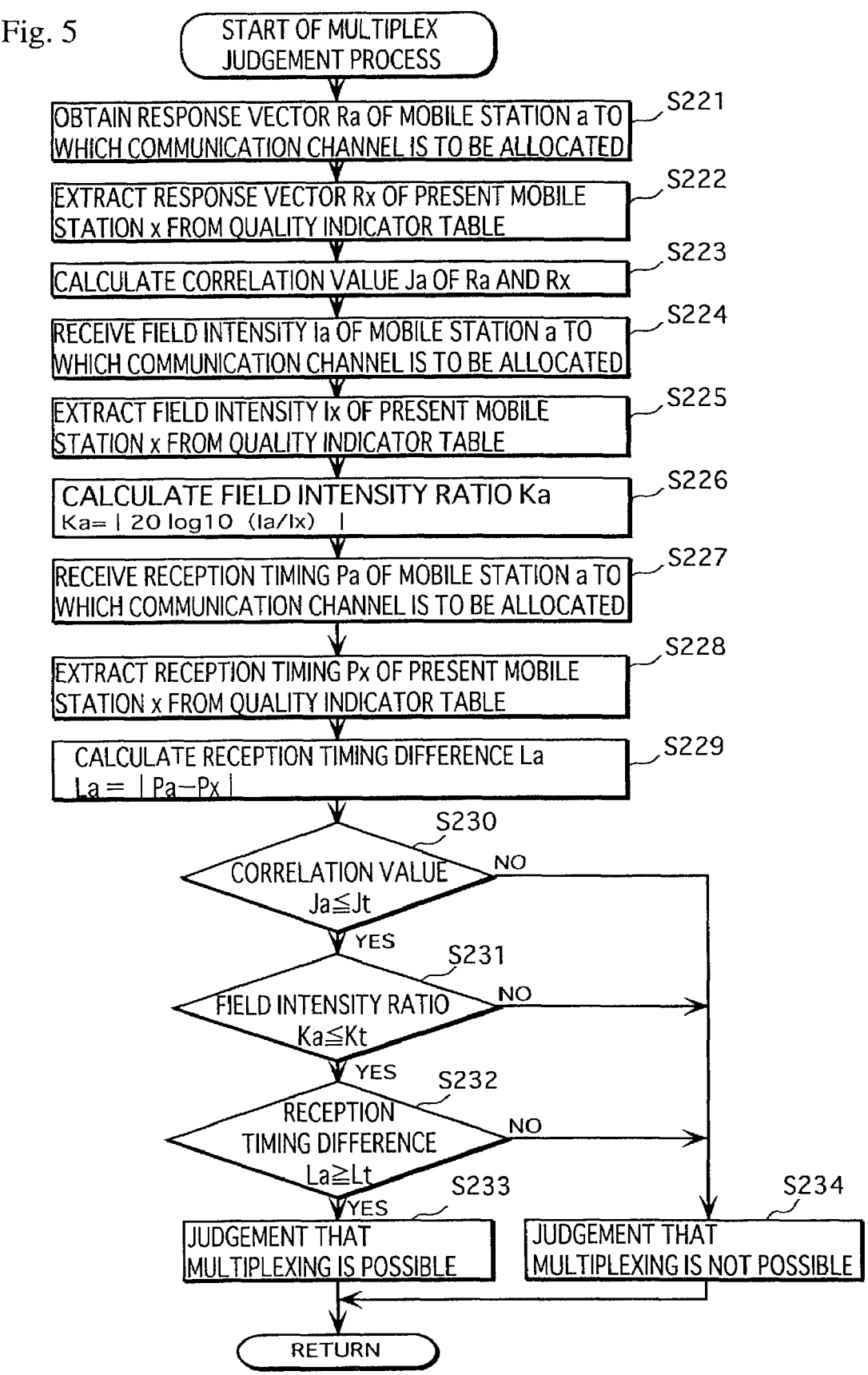
FIG. 5 is a flowchart showing a multiplex judgement procedure.

Next, details of the multiplex judgement process in step S188 in the flowchart shown in FIG. 4 are described using the flowchart in FIG. 5.

The control unit 80 performs the process shown by the flowchart in FIG. 5 for mobile station that is already communicating in the particular timeslot.

The control unit 80 receives the response vector Ra of the mobile station a that has requested a communication channel from the response vector calculation unit 53 (step S221). Then the control unit 80 reads the response vector Rx of the mobile station already communicating from the area in the quality indicator value table 300 identified by the timeslot number that identifies the particular timeslot (step S222), and calculates correlation value Ja between the response vector Ra and the response vector Rx (step S223).

Next, the control unit 80 receives the field intensity Ia of the mobile station a that has requested a communication channel from the RSSI detection unit 54 (step S224). Then the control unit 80 reads the field intensity Ix of the mobile station X already communicating from the area in the quality indicator value table 300 identified by the timeslot number that identifies the particular timeslot (step S225), and calculates the field intensity ratio Ka (step S226).

Next, the control unit 80 receives the reception timing Pa of the mobile station a that has requested a communication channel, from the reception timing detection unit 55 (step S227). Then the control unit 80 reads the reception timing Px on the mobile station already communicating from the area in the quality indicator value table 300 identified by the timeslot number that identifies the particular timeslot (step S228), and calculates the reception timing difference La (step S229).

Next, the control unit 80 compares the calculated correlation value Ja and the correlation value threshold value Jt stored in the threshold value table 200, compares the calculated field intensity Ka and the field intensity threshold value Kt stored in the threshold value table 200, and compares the calculated reception timing difference La and the reception timing difference threshold value Lt stored in the threshold value table 200; and if $Ja \leq Jt$ (step S230) and $Ka \leq Kt$ (step S231) and $La \geq Lt$ (step S232), the control unit 80 judges that multiplexing is possible (step S233). In any other case, the control unit 80 judges that multiplexing is not possible (step S234)

If it is judged that multiplexing is possible with all mobile stations already communicating in the particular timeslot, the control unit 80 judges that multiplexing is possible in the particular timeslot. In other cases, the control unit 80 judges that multiplexing is not possible in the particular timeslot.

3 Summary

In communication channel allocation according to spatial multiplexing, the above-described radio base station 100 detects the reception timing difference between a signal received from a mobile station that is already communicating with the radio base station 100 in a timeslot and a signal received from a mobile station that has newly requested to be allocated a communication channel, and only when the detected reception timing difference is equal to or higher than a threshold value, allocates a communication channel in the particular timeslot to the mobile station that has made the request. When the reception timing difference is lower than the threshold value, the radio base station 100 does not allocate a communication channel, since it is thought that an suitable directivity pattern cannot be formed. According to the construction of the present radio base station 100, combinations of mobile stations that are suitable for spatial multiplexing are judged with more accuracy than with conventional constructions. Since spatial multiplexing is performed suitably, stability of communication is increased, and favorable communication quality can be assured.

4 Other Modifications (1) In the above-described embodiment, the control unit 80 immediately allocates a communication channel according to spatial multiplexing in a timeslot in which multiplexing is judged to be possible in the multiplex judgement process. However, the control unit 80 may determine the response vector correlation value, the field intensity ratio and the reception timing difference between a new mobile station and a mobile station already communicating with the radio base station 100 in all timeslots, find the maximum response vector correlation value, the minimum field intensity and the minimum reception timing difference for all timeslots, and allocate a communication channel in the timeslot which is judged from the found values to have the best communication quality.

(2) The threshold value table 200 may store threshold values different between radio base stations. For example, in a radio base station that is positioned in a large city where the influence of interference waves is strong, the conditions for judging that multiplexing is possible can be made more strict by setting a low correlation value threshold value, a high field intensity ratio threshold value, and a high reception timing difference threshold value, to lessen the influence of interference. Furthermore, in a radio base station that is placed in an area where the influence of interference waves is weak, the conditions for judging multiplexing to be possible can be eased by setting a high correlation value threshold value, a low field intensity ratio threshold, and a low reception timing difference threshold value to increase the number of mobile stations that can connect. According to this structure, the relationship between communication quality and the number of mobile stations that can connect can be adjusted effectively for each radio base station.

(3) The information storage unit 90 may be composed of a plurality of threshold value tables 200 that store different threshold values, and in the multiplex judgement process, the control unit 80 may use a threshold value in response to the number of mobile stations that are being spatially multiplexed. It is thought that the effect of interference waves increases when the number of mobile stations that are being spatially multiplexed increases in each timeslot. Accordingly, when the number of mobile stations that are being spatially multiplexed is high, a threshold value table that stores a low correlation value threshold value, a high field intensity threshold value, and a high reception timing difference value may be used to reduce the effects of interference waves by making the conditions for judging that multiplexing is possible more strict. When the number of mobile stations that are being spatially multiplexed is low, the conditions may be eased. According to this structure, the relationship between communication quality and the number of connected mobile stations can be effectively adjusted in response to the number of mobile stations that are being spatially multiplexed.

(4) The control unit 80 may check whether the part of the signal received from a new mobile station and the signal received from a mobile station already communicating that is compared with the reference signal are the same or not, and if they are the same, perform the reception timing threshold value comparison in the aforementioned judgement to determined whether spatial multiplexing is possible, and not take reception timing into consideration if they are different. This is because in mobile stations whose reference signal is different, the signals of the mobile stations can be separated even if the reception timing is the same.

(5) The radio base station 100 may instruct a new mobile station to transmit a signal of which the part that is compared to the reference signal is different to the signal of a mobile station already communicating, and the new mobile station may transmit a signal in accordance with that instruction. According to this structure, since the portion of the signal that is compared to the reference signal differs between mobile stations, there is no need to take reception timing into consideration in the aforementioned judgement to determine whether spatial multiplexing in possible.

INDUSTRIAL USE

The radio base station of the present invention can be applied to a base station for communicating with mobile stations such as mobile telephones, and the control method of the radio base station of the present invention can be used in a radio base station to assure steady communication quality.

The invention claimed is:

1. A radio base station that performs radio communication with a plurality of mobile stations according to spatial multiplexing, comprising:
   a detection means for detecting the reception timing difference between a signal received from a mobile station already communicating with the radio base station and a signal received from a mobile station that is newly initiating communication with the radio base station; and
   a multiplex judgment means for judging, by comparing the detected reception timing difference with a threshold value, whether the mobile station that is newly initiating communication with the radio base station can be included as a member for the spatial multiplexing, wherein
   judging whether the spatial multiplexing is applicable based on a reception timing difference between the signal received from the mobile station already communicating with the radio base station and the signal received from the mobile station that is newly initiating communication with the radio base station;
   a calculation means for calculating (a) a correlation value between a response vector of the mobile station already communicating with the radio base station and a response vector of the mobile station that is newly initiating communication with the radio base station, and (b) a ration of a field intensity of the signal received from the mobile station already communicating with the radio base station to a field intensity of the signal received from the mobile station that is newly initiating communication with the radio base station, wherein the multiplex judgment means judges whether the mobile station that is newly initiating communication with the radio base station can be included as a member for spatial multiplexing, by comparing the calculated correlation value between the response vectors, the calculated ratio of the field intensity, and the detected reception timing difference, with respective threshold values.

2. The radio base station of claim 1, instructing an identical time frame as a period for signal transmission, to the mobile station already communicating with the radio base station and the mobile station that is newly initiating communication with the radio base station, and receiving the signal from both the mobile stations in the identical time frame, wherein the detection means measures a time at which a signal is received from each of the mobile stations, using a starting point of the time frame as a basis, and detects a difference between the time at which each signal is received as the reception timing difference.

3. A control method for a radio base station that performs radio communication with a plurality of mobile stations according to spatial multiplexing, comprising:

a detection step of detecting the reception timing difference between the signal received from the mobile station already communicating with the radio base station and the signal received from the mobile station that is newly initiating communication with the radio base station; and a multiplex judgment step of judging, by comparing the detected reception timing difference with a threshold value, whether the mobile station that is newly initiating communication with the radio base station can be included as a member for the spatial multiplexing;

a calculation step of calculating a correlation value between a response vector of the mobile station already communicating with the radio base station and a response vector of the mobile station that is newly initiating communication with the radio base station, wherein, in the multiplex judgment step, the judgment is about whether the mobile station that is newly initiating communication with the radio base station can be included as a member for spatial multiplexing, by comparing the calculated correlation value between the response vectors and the detected reception timing difference, with respective threshold values.

4. A program recording medium having recorded thereon a program for controlling a radio base station that performs radio communication with a plurality of mobile stations according to spatial multiplexing, the program comprising:

a detection step of detecting the reception timing difference between the signal received from the mobile station already communicating with the radio base station and the signal received from the mobile station that is newly initiating communication with the radio base station; and a multiplex judgment step of judging, by comparing the detected reception timing difference with a threshold value, whether the mobile station that is newly initiating communication with the radio base station can be included as a member for the spatial multiplexing;

a calculation step of calculating a correlation value between a response vector of the mobile station already communicating with the radio base station and a response vector of the mobile station that is newly initiating communication with the radio base station, wherein, in the multiplex judgment step, the judgment is about whether the mobile station that is newly initiating communication with the radio base station can be included as a member for spatial multiplexing, by comparing the calculated correlation value between the response vectors, and the detected reception timing difference, with respective threshold values.

5. A radio base station that performs radio communication with a plurality of mobile stations according to spatial multiplexing, comprising:

a detection means for detecting the reception timing difference between a signal received from a mobile station already communicating with the radio base station and a signal received from the mobile station that is newly initiating communication with the radio base station; and a multiplex judgment means for judging, by comparing the detected reception timing difference with a threshold value, whether the mobile station that is newly initiating communication with the radio base station can be included as a member for the spatial multiplexing, wherein judging whether the spatial multiplexing is applicable based on a reception timing difference between the signal received from the mobile station already communicating with the radio base station and the signal received from the mobile station that is newly initiating communication with the radio base station;

a calculation means for calculating a correlation value between a response vector of the mobile station already communicating with the radio base station and a response vector of the mobile station that is newly initiating communication with the radio base station, wherein the multiplexing judgment means judges whether the mobile station that is newly initiating communication with the radio base station can be included as a member for spatial multiplexing, by comparing the calculated correlation value between the response vectors and the detected reception timing difference, with respective threshold values.

6. A radio base station that performs radio communication with a plurality of mobile stations according to spatial multiplexing, comprising:

a detection means for detecting the reception timing difference between a signal received from a mobile station already communicating with the radio base station and a signal received from the mobile station that is newly initiating communication with the radio base station; and a multiplex judgment means for judging, by comparing the detected reception timing difference with a threshold value, whether the mobile station that is newly initiating communication with the radio base station can be included as a member for the spatial multiplexing, wherein judging whether the spatial multiplexing is applicable based on a reception timing difference between the signal received from the mobile station already communicating with the radio base station and the signal received from the mobile station that is newly initiating communication with the radio base station;

a calculation means for calculating a ratio of a field intensity of the signal received from the mobile station already communicating with the radio base station to a field intensity of the signal received from the mobile station that is newly initiating communication with the radio base station, wherein the multiplex judgment means judge whether the mobile station that is newly initiating communication with the radio base station can be included as a member for spatial multiplexing, by comparing the calculated ratio of the field intensity and the detected reception timing difference, with respective threshold values.

* * * * *